(12) United States Patent
Whyatt et al.

(10) Patent No.: US 8,916,302 B2
(45) Date of Patent: Dec. 23, 2014

(54) METHOD AND APPARATUS FOR IMPROVING WATER BALANCE IN FUEL CELL POWER UNIT

(75) Inventors: Greg A. Whyatt, West Richland, WA (US); Paul E. George, II, Powell, OH (US)

(73) Assignee: Battelle Memorial Institute, Richland, WA (US)

( * ) Notice: Subject to any disclaimer, the term of this patent is extended or adjusted under 35 U.S.C. 154(b) by 1326 days.

(21) Appl. No.: 11/831,193

(22) Filed: Jul. 31, 2007

(65) Prior Publication Data

US 2008/0113228 A1   May 15, 2008

Related U.S. Application Data

(63) Continuation-in-part of application No. 11/595,203, filed on Nov. 10, 2006, now abandoned.

(51) Int. Cl.
*H01M 8/04* (2006.01)
*H01M 8/06* (2006.01)

(52) U.S. Cl.
CPC ............ *H01M 8/04164* (2013.01); *Y02E 60/50* (2013.01); *H01M 8/0612* (2013.01); *H01M 8/04141* (2013.01)
USPC ........... 429/414; 429/400; 429/408; 429/413; 429/428; 429/434

(58) Field of Classification Search
USPC .................. 429/400, 408, 413, 414, 428, 434
See application file for complete search history.

(56) References Cited

U.S. PATENT DOCUMENTS

| | | | | |
|---|---|---|---|---|
| 4,943,493 A | * | 7/1990 | Vartanian | 429/415 |
| 6,120,923 A | * | 9/2000 | Van Dine et al. | 429/420 |
| 6,207,306 B1 | * | 3/2001 | Sederquist | 429/413 |
| 2005/0136304 A1 | * | 6/2005 | Pettit et al. | 429/26 |
| 2005/0153176 A1 | * | 7/2005 | Forte et al. | 429/17 |
| 2005/0199192 A1 | * | 9/2005 | Goebel et al. | 123/41.01 |
| 2005/0260469 A1 | | 11/2005 | Forte | |
| 2006/0188761 A1 | * | 8/2006 | O'Brien et al. | 429/19 |

OTHER PUBLICATIONS

PCT Written Opinion and Search Report, Apr. 23, 2008.

* cited by examiner

*Primary Examiner* — Ula C Ruddock
*Assistant Examiner* — Amanda Barrow
(74) *Attorney, Agent, or Firm* — A. J. Gokcek

(57) ABSTRACT

A method and apparatus for improving the water balance in a power unit by providing the exhaust gas from the cathode side of the fuel cell as a feed gas to the combustion system condensing at least a portion of water present in the effluent from the combustion system in a condenser, and then transferring water vapor from the uncondensed portion of the effluent from the condenser to the gas fed to the cathode side of the fuel cell. Water from the exhaust gas from the cathode side of the fuel cell is either captured in the condenser, or is reused in the feed gas of the cathode side of the fuel cell. By humidifying the air fed into system with the water vapor present in the exhaust gas, water is not lost from the system. Instead, the air is being fed into the system is humidified with this water, which in turn allows the humidifier to operated at higher temperatures and/or use smaller radiators and fans and/or draw less parasitic power, thereby increasing overall system efficiency.

3 Claims, 4 Drawing Sheets

METHOD AND APPARATUS FOR IMPROVING WATER BALANCE IN FUEL CELL POWER UNIT

CROSS REFERENCE TO RELATED APPLICATIONS

This application claims priority from and is a continuation in part of U.S. patent application Ser. No. 11/595,203, filed Nov. 10, 2006, now abandoned the contents of which are incorporated herein by reference.

TECHNICAL FIELD

This invention relates to fuel cells, and more specifically to steam reforming fuel systems, and methods to improve the water balance in these systems.

BACKGROUND OF THE INVENTION

The need for mobile electrical power generation systems has traditionally been satisfied with generators powered by internal combustion engines fueled with material such as gasoline or diesel fuel. While these systems have proven reliable and efficient in numerous applications, they are not suitable in certain other applications. For example, in many military applications the requirement that a single fuel source power both a vehicle and an auxiliary power system prevents the use of off-the-shelf internal combustion gasoline generator systems. Additionally, issues related to the noise and vibration generated by internal combustion systems can render their use unacceptable in particular situations.

One alternative to typical internal combustion systems are fuel cell-based electrical power generation systems. Of particular interest are polymer electrolyte membrane (PEM) fuel cells used in conjunction with steam reforming systems. Combining a PEM fuel cell with a steam reforming system, these systems provide a mobile source of electricity that is quiet, efficient, and capable of being powered by a variety of hydrocarbon fuel streams.

Generally speaking, fuel cells generate water and electricity as outputs. In addition, combustion processes such as those used to heat a steam reformer generate water vapor. However, steam reforming systems use water as an input. Therefore, power generation systems that combine fuel cells with steam reforming systems must have water available as an input, or make efficient use of water formed in the fuel cell and reformer combustor. Operation of these power generation systems in environments with high temperatures requires efficient use and recovery of water. Maintaining a positive water balance, where water condensed and recovered exceeds that being fed to the process, becomes more and more difficult for high ambient temperatures (i.e. >40° C.) due to the close approach temperatures that must be achieved in the radiator and condenser. The result is that a system designed to reach water balance at high ambient temperature will have very large radiators and have a significant parasitic penalty for radiator fan power. At some point, maintaining positive water balance is simply not possible regardless of radiator size.

Accordingly, there exists a need for methods and apparatus that allow a power unit for generating electrical power that has a steam reforming system and a fuel cell to conserve water available to the power unit. There is a further need to increase the efficiency of a power unit for generating electrical power that has a steam reforming system and a fuel cell.

SUMMARY OF THE INVENTION

The present invention provides a method and apparatus for improving water balance in a power unit. As used herein, a "power unit" is a system for generating electrical power that has fuel reformer utilizing water (based either steam reforming or autothermal reforming) and a fuel cell. The type of the particular fuel cell with which the invention can be applied includes not only PEM (Polymer Electrode Membrane) types of fuel cells but also SOFC (Solid Oxide Fuel Cells), phosphoric acid fuel cells and other types of fuel cells. The steam reforming system includes a system for performing steam reforming reactions to generate synthesis gas and a combustion heating system for generating the heat to promote the steam reforming reactions. In autothermal reforming, air is added to the reforming mixture and the resulting oxidation reactions provide the heat required to support reforming reactions. In one ATR arrangement the reformate is provided directly to the anode and unused fuel in the anode exit is used to generate heat in a waste anode gas burner. Recovery of water from the cathode and anode waste gas burner is analogous to the recovery of water from the cathode and main burner exhaust in a steam reforming system. The discussion that follows will address one example of a steam reforming system with a PEM fuel cell but should not be considered limiting in terms of the choice of either reforming technology or fuel cell technology. A PEM fuel cell includes an anode side, which is fed a gas containing hydrogen, and a cathode side, which is fed a gas containing oxygen. Within such a fuel cell, the hydrogen fed to the anode side and the oxygen fed to the cathode side are combined to produce electricity and water. The present invention is suitable for use with power units and components of the power units of various designs. Accordingly, no further elaboration of the design and operation of the steam reforming system, the combustion system, and the fuel cell is necessary to enable one of ordinary skill in the art to make or use the present invention.

The present invention improves the water balance in the power unit by utilizing the exhaust gas from the cathode side of the fuel cell as a feed gas to the combustion system of the steam reforming system. Once this exhaust gas has been utilized to support combustion to provide heat to the reforming reactions, generate steam, etc., the system condenses at least a portion of water present in the effluent from the combustion system in a condenser, and then transfers water vapor from the uncondensed portion of the effluent from the condenser to the gas fed to the cathode side of the fuel cell. In this manner, the water from the exhaust gas from the cathode side of the fuel cell is either captured in the condenser, or is reused in the feed gas of the cathode side of the fuel cell. The feed gas for the cathode side of the fuel cell is typically air. By humidifying the air fed into the system with the water vapor present in the exhaust gas, this water is not lost from the system. Instead, the air is being fed into the system is humidified with this water, which in turn allows the condenser to be operated at higher temperatures and/or use smaller radiators and fans and/or draw less parasitic power, thereby increasing overall system efficiency.

In the preferred embodiment of the present invention, the benefits of the present invention are attained by bringing effluent from both the combustor and the cathode to the condenser. "Effluent" refers to any gas directed into the condenser that contains water. Accordingly, while it is preferable that both effluents be provided to the condenser, at least some improvement in water balance is attained by bringing either effluent alone to the condenser. Accordingly, the present invention should be understood to encompass embodiments where the effluent from the combustor is provided to the condenser, where the effluent from the cathode is brought to the condenser, and embodiments where both are brought to the condenser, either in parallel or in series.

Similarly, the benefits of the present invention are attained when a portion of the humidity transferred in the humidifier is transferred to an inlet air stream. The inlet air stream may in turn provide the air feeding the cathode and/or the air feeding the combustor. Accordingly, while it is preferable that the output of the humidifier be routed first to the inlet of the cathode and then to the inlet of the combustor in series, at least some improvement in water balance will be achieved if the output of the humidifier is routed to the inlet of the cathode alone, to the inlet of the combustor alone, or to both, either in series or in parallel, as described above. The present invention should be understood to include all such combinations.

Preferably, but not meant to be limiting, transferring water from the uncondensed portion of the water in the effluent from the condenser to the gas fed to the cathode side is performed by a desiccant wheel or a water vapor permeable membrane such as a nafion membrane. These same structures, desiccant wheel, water vapor permeable membrane or nafion membrane may also be utilized as a second humidifier for humidifying the gas fed to the cathode side of the PEM fuel cell using water present in the cathode exhaust in some embodiments of the invention.

Preferably, but not meant to be limiting, in the preferred embodiment of the invention, the system is configured to heat the exhaust gas from the cathode side of the PEM fuel cell with the effluent gas from the combustion system in a recuperative heat exchanger prior to feeding the exhaust gas from the cathode side of the PEM fuel cell into the combustion system. This configuration assists both the synthesis gas forming reactions, by using waste heat to preheat the air fed to the combustor providing heat to drive the reactions and the capture of water, by cooling the effluent gas from the combustion system, prior to condensing the water in the effluent gas.

Preferably, the present invention uses a series of check valves to route the various gasses in a manner that anticipates different operating conditions, and protects the various equipment used in the system. For example, and not meant to be limiting, the preferred embodiment of the present invention preferably provides a check valve in the connection of the exhaust gas from the cathode side of the PEM fuel cell to the combustion system of the steam reforming system to prevent backflow from the combustion system. As a further example, and not meant to be limiting, the preferred embodiment of the present invention preferably provides a check valve in the connection of the exhaust gas from the cathode side of the PEM fuel cell to an inlet to the condenser to prevent pressurization of the exhaust gas from the cathode side of the PEM fuel cell. As yet another example, and not meant to be limiting, the preferred embodiment of the present invention preferably provides a check valve connecting an outlet of the humidifier to an outlet of the cathode side of the PEM fuel cell, allowing a flow of gas containing oxygen to bypass the inlet to the cathode side of the PEM fuel cell. As a final example, and not meant to be limiting, the preferred embodiment of the present invention preferably provides a check valve connecting an outlet of the humidifier to a startup blower in sequence with a startup combustor, to prevent backflow of hot combustion gasses which could damage the startup blower.

BRIEF DESCRIPTION OF THE DRAWINGS

The following detailed description of the embodiments of the invention will be more readily understood when taken in conjunction with the following drawings, wherein:

As shown in FIG. 4, a unit which achieved water balance at 48° C. is able to achieve water balance at just over 70° C. due to the effect of the humidification unit of the present invention. This benefit could either be realized by increasing the maximum temperature at which water balance is achieved or could be used to reduce radiator size, noise, and/or parasitic power consumption.

DETAILED DESCRIPTION OF THE PREFERRED EMBODIMENTS

Figure 1:
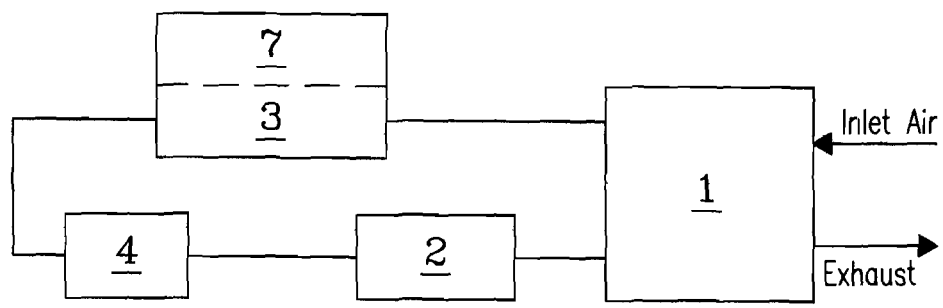
FIG. 1 is a general schematic diagram of a fuel cell system according to one embodiment of the present invention.

For the purposes of promoting an understanding of the principles of the invention, reference will now be made to the embodiments illustrated in the drawings and specific language will be used to describe the same. It will nevertheless be understood that no limitations of the inventive scope is thereby intended, as the scope of this invention should be evaluated with reference to the claims appended hereto. Alterations and further modifications in the illustrated devices, and such further applications of the principles of the invention as illustrated herein are contemplated as would normally occur to one skilled in the art to which the invention relates.

Figure 6:
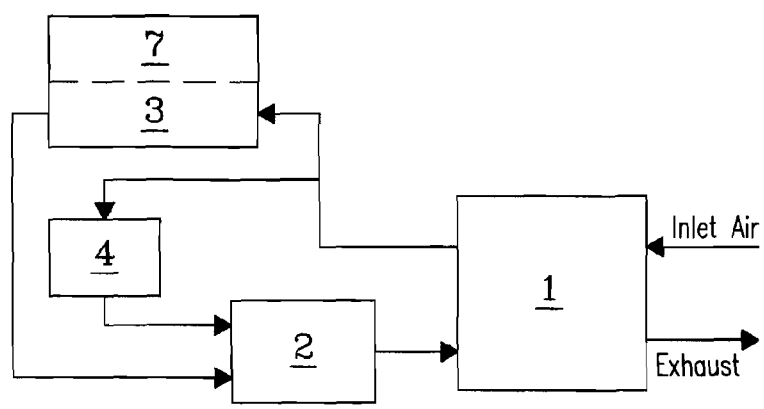
FIG. 6 is a general schematic diagram of a fuel cell system according to another embodiment of the present invention in which incoming air is supplied in parallel to the fuel cell cathode and steam reformer combustor after being humidified by the transfer of uncondensed water from the condenser exhaust.

One form of the present invention provides a humidifier coupling the reformer exhaust and the incoming cathode air. In use with a PEM type of fuel cell as is shown in FIG. 1, inlet air enters a system at humidifier 1 where water is transferred from the uncondensed portion of the water in the effluent from the condenser 2 to the gas fed to the cathode side 3 of a PEM fuel cell. Inlet air from humidifier 1 is also fed to the cathode side 3 of a PEM fuel cell where it reacts with hydrogen fed to the anode side to produce water and electricity. The exhaust gas from the cathode side 3 of the PEM fuel cell is fed to the combustion system of the steam reforming system 4. The effluent from the combustion system of the steam reforming system 4 is then condensed in condenser 2, and any residual water vapor in the effluent gas is fed to humidifier 1 where it is transferred to inlet air entering the system, as described above. An alternate embodiment using these same components is shown in FIG. 6. While the arrangement shown in FIG. 6 is less preferred, it should still be considered as contemplated by the present invention.

Figure 2:
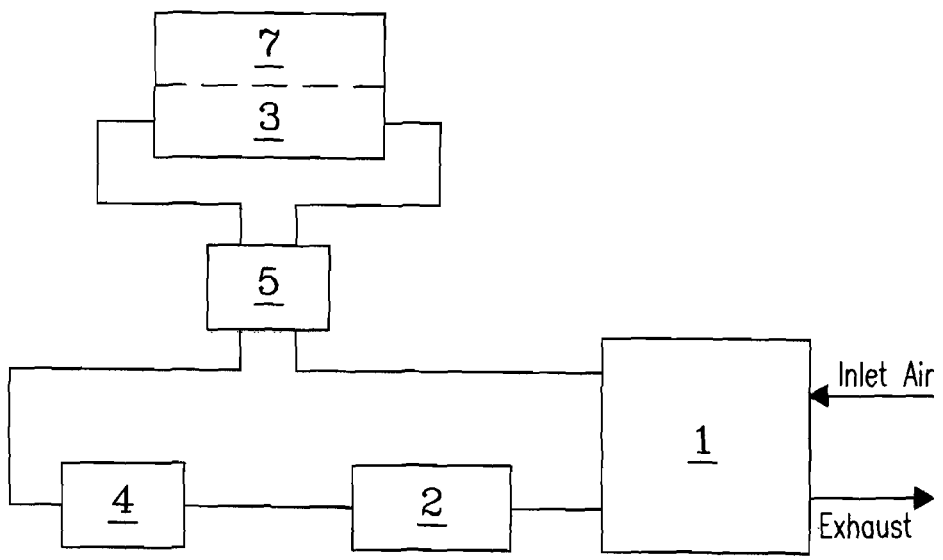
FIG. 2 is a general schematic diagram of a fuel cell system according to another embodiment of the present invention.

Another form of the present invention is shown in FIG. 2. This embodiment is similar to that shown in FIG. 1, but in this embodiment, a second humidifier 5 is interposed to transfer water vapor from the effluent gas leaving the fuel cell 3 to the gas fed to the fuel cell cathode 3. As with the embodiment shown in FIG. 1, a second humidifier 5 also couples the reformer exhaust and the incoming cathode air. As shown in FIG. 2, inlet air enters a system at humidifier 1 where water is transferred from the uncondensed portion of the water in the effluent from the condenser 2 to the gas entering the second humidifier 5. The humidified inlet air then flows into a second humidifier interposed to transfer water vapor from the effluent gas leaving the fuel cell cathode 3 to the gas fed to the fuel cell. Inlet air leaving humidifier 5 is then fed to the cathode side of a PEM fuel cell cathode 3 where it reacts with hydrogen fed to the anode side to produce water and electricity. The exhaust gas leaving the fuel cell cathode 3 then flows into a second humidifier as has been described previously. After leaving the second humidifier, exhaust gas is then fed into the combustion system of the steam reforming system. The effluent from the combustion system of the steam reforming system 4 is then condensed in condenser 2, and any residual water vapor in the effluent gas is fed to humidifier 1 where it is transferred to inlet air entering the system, as described above.

Figure 3:
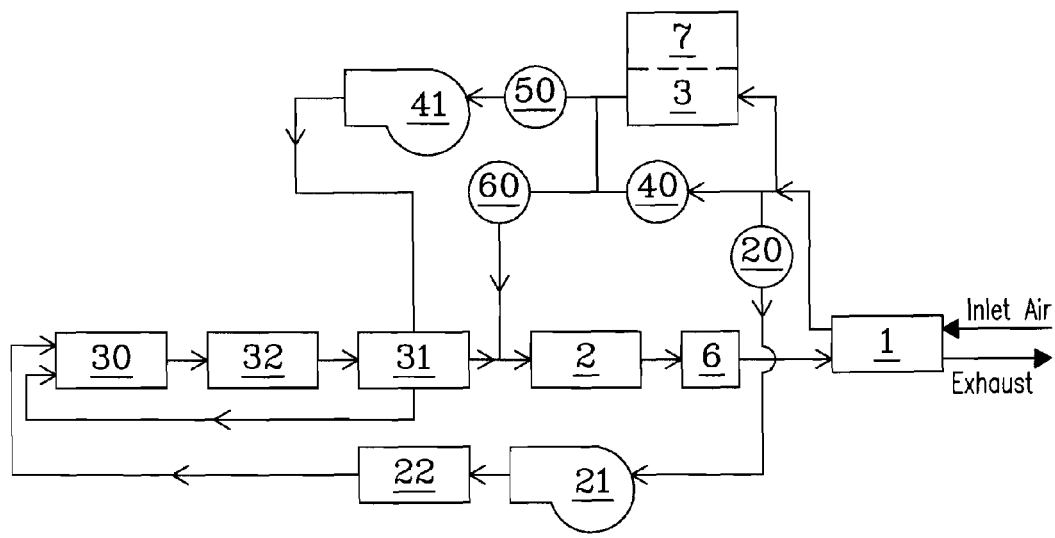
FIG. 3 is a general schematic diagram of a fuel cell system according to another embodiment of the invention.

Yet another embodiment of the present invention is shown in FIG. 3. FIG. 3 shows that inlet air enters a system at humidifier 1 where water is transferred from the uncondensed portion of the water in the effluent from the condenser 2 to the gas fed to the cathode side 3 of a PEM fuel cell. During start up operations, air is fed through bypass valve 20 to blower 21, and into start up combustor 22. This heated effluent is then directed through the main combustor 30 (to heat up the main combustor 30 in preparation for normal operations), through the main steam reformer 32 and then through the recuperator 31, to condenser 2, where water is collected in water tanks 6, and any residual water vapor in the effluent gas is fed to humidifier 1 where a portion is transferred to inlet air entering the system, as in the description of FIGS. 1 and 2.

As shown in FIG. 3, the main combustor 30, main steam reformer 32, and recuperator 31 form the steam reforming system 4 of FIGS. 1 and 2. During normal (after startup) operations, bypass valve 20 and 40 are closed, directing inlet air from humidifier 1 to the cathode side 3 of PEM fuel cell where it reacts with hydrogen fed to the anode side 7 to produce water and electricity. Air then flows through check valve 50, through recuperator 31, combustor 30, reformer 32 and again through recuperator 31 before entering condenser 2. Check valve 50 closes during the period in which startup blower 21 is operating without main fuel processor blower 41, preventing backflow of hot gas from recuperator 31 to main fuel processor blower 41.

Check valve 20 is in between the connection of the exhaust gas from the cathode side 3 of the PEM fuel cell to the main combustion system 30 to prevent backflow from the combustion system 30, potentially damaging blower 21. Check valve 60 is in between the connection of the exhaust gas from the cathode side 3 of the PEM fuel cell and the inlet to the condenser 2 to prevent pressurization of the exhaust gas from the cathode side 3 of the PEM fuel cell. Check valve 60 opens in the event that a blower in the fuel cell (not shown) is moving more gas than the main fuel processor blower 41. Check valve 40 connects the outlet of the humidifier 1 to an outlet of the cathode side 3 of the PEM fuel cell, allowing a flow of gas containing oxygen to bypass the inlet to the cathode side 3 of the PEM fuel cell. Check valve 40 opens in the event that the main fuel processor blower 41 moves more gas than the fuel cell blower (not shown) provides.

Figure 4:
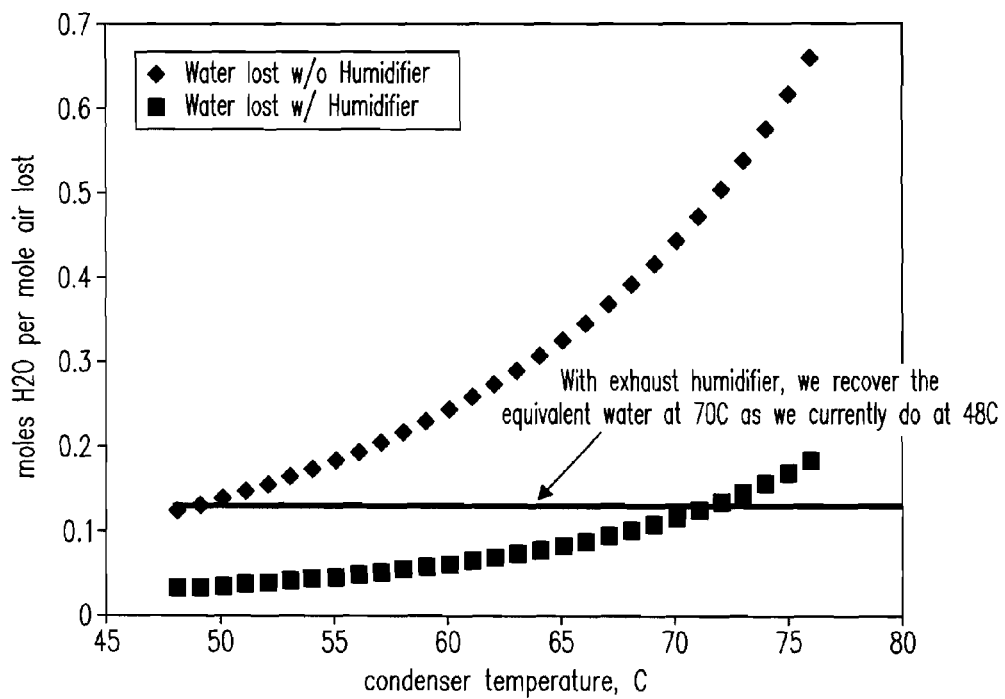
FIG. 4 is a graph showing water loss from a power unit system as a function of condenser temperature with and without the inclusion of the humidifier of the preferred embodiment of the present invention, assuming that the humidification unit achieves a 5° C. dew point approach on the humid end of the humidification unit.

As shown in FIG. 4, water loss from the system is a function of condenser temperature. It is assumed that the humidification unit achieves a 5° C. dew point approach on the humid end of the humidification unit. In this case, a unit which achieved water balance at 48° C. is now able to achieve water balance at just over 70° C. due to the effect of the humidification unit, as shown in the preferred embodiments of the present invention. This benefit could either be realized by increasing the maximum temperature at which water balance is achieved or could be used to reduce radiator size, noise and parasitic power. By raising the coolant temperature from 45° C. to ~70° C. the outlet temperature approach on the radiator is increased from ~5° C. to ~30° C. which greatly increases the ability of the radiators to reject the heat. This in turn makes a water balance at elevated temperatures achievable.

In some applications it may be desired to utilize a fuel processor based on auto-thermal reforming (ATR) rather than steam reforming. In an ATR fuel processor, fuel, steam and air are mixed and reacted to form reformate. Heat to support the reforming reaction is provided by partial combustion of the fuel. Because these systems must add air to the reforming reaction, they tend to operate at lower pressure and deliver unpurified reformate directly to the fuel cell anode. In order to prevent CO poisoning of the anode, CO must be reduced to low levels which is typically achieved using a water gas shift (WGS) and preferential oxidation (PROX) reaction. Together the systems that provide these reactions constitute an ATR fuel processor.

Figure 5:
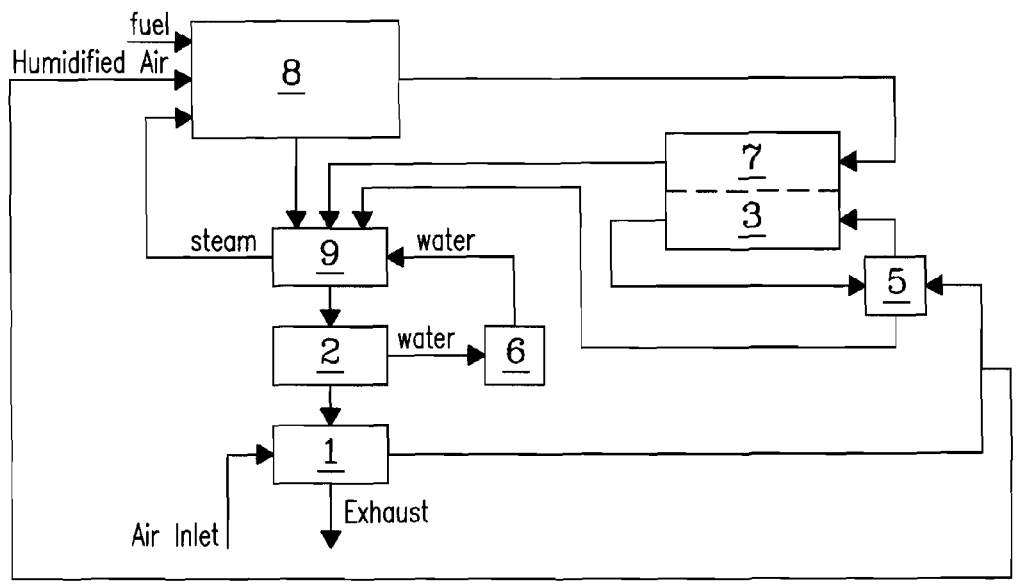
FIG. 5 is a general schematic diagram of a fuel cell system according to another embodiment of the present invention based on auto-thermal reforming (ATR) rather than steam reforming.

An example application of the present invention in a fuel cell power system using an ATR fuel processor is illustrated in FIG. 5. Oxygen containing gas (typically air or enriched air) enters the humidifier 1 where uncondensed water vapor is transported from the exhaust into the incoming gas stream. A portion of the humidified air is delivered to the ATR fuel processor 8 where it is mixed with fuel and steam produced when water is fed from a reservoir 6 to a vaporizer 9. The fuel, air and steam react within the ATR fuel processor 8 to form hydrogen-rich reformate which then enters the anode 7 of the PEM fuel cell.

The portion of the incoming oxygen containing gas not delivered to the ATR fuel processor 8 is delivered to a fuel cell humidifier 5, where water vapor is transferred into the stream. The gas then enters the fuel cell cathode 3 where the oxygen concentration is depleted due to the oxidation of hydrogen to form water. The cathode exhaust then passes back through the humidifier 5 where a portion of the water is transferred to the gas stream entering the fuel cell cathode 3 and then enters an oxidizer (not shown) where it is combined with the exhaust from the fuel cell anode 7 and reacted to fully oxidize the anode exhaust. The energy released during oxidation of the anode exhaust may be used with heat (Q) from the auto-thermal fuel processor 8 in the vaporizer 9 to generate steam. Alternatively, the energy from oxidation of the exhaust from the anode 7 may be used to drive a compressor-expander. In either case, the reaction of the anode exhaust and cathode exhaust streams forms water due to the oxidation of hydrogen, and that exhaust stream enters the condenser 2 where a fraction of the water is condensed and collected in the water tank 6. The exhaust from the condenser 2 then enters the humidifier 1 where a portion of the uncondensed water is transferred into the incoming air.

Figure 7:
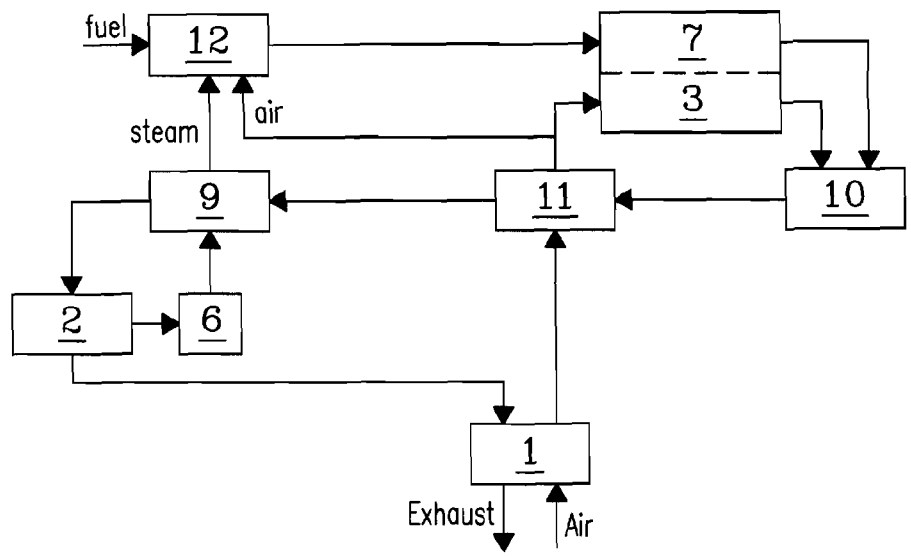
FIG. 7 is a general schematic diagram of a fuel cell system according to another embodiment of the present invention based on auto-thermal reforming (ATR) with an SOFC fuel cell.

Yet another embodiment of the present invention is shown in FIG. 7. In this embodiment the invention is applied to a system with an ATR reformer 12 and an SOFC fuel cell. Referring to FIG. 7, air enters the system via the nafion membrane humidifier 1 where water is transferred from the exhaust into the incoming air. The humidified air is then heated in the heat exchanger 11 before being split between the ATR reformer 12 and the SOFC cathode 3. Steam is created for use in the ATR 12 feeding water from the reservoir 6 to the vaporizer 9. The air, fuel and steam react in the ATR 12 to form a hydrogen rich mixture. Because the SOFC is tolerant to CO, no water-gas shift for preferential oxidation reactors are needed before feeding the mixture to the fuel cell anode 7. Within the fuel cell, oxygen passes from the cathode 3 to the anode 7, forming water. Gases leaving the cathode 3 and anode 7 are combined and combusted in the waste anode gas burner 10 to provide additional heat and water. Heat from this combustion is used to preheat incoming air in the heat exchanger 11 and generate steam in the vaporizer 9. The stream is then cooled in the condenser 2 to recover liquid water to refill the reservoir 6. Finally, the exhaust exits through the humidifier 1 where a portion of the uncondensed water vapor is transferred to the incoming air.

Figure 8:
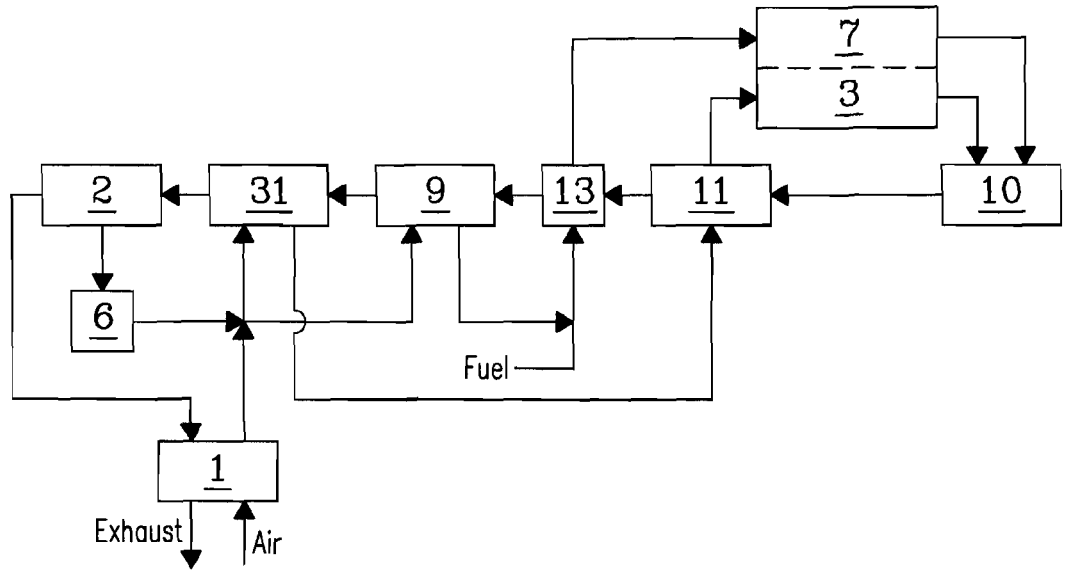
FIG. 8 is a general schematic diagram of a fuel cell system according to another embodiment of the present invention based on steam reforming with an SOFC fuel cell

Another embodiment of the present invention is shown in FIG. 8. In this embodiment the invention is applied to a system utilizing steam reforming with an SOFC fuel cell. FIG. 8 shows air entering the system through the humidifier 1 where it picks up water vapor from the exhaust stream. This humidified air is then heated to near SOFC temperatures first in the recuperator 31 and then in the heat exchanger 11 before entering the cathode 3. Water is drawn from the water reservoir 6 and vaporized in the vaporizer 9 before being mixed with fuel and reformed in the steam reforming reactor 13 to generate a hydrogen and CO containing reformate. The reformate enters the anode 7 where it reacts with oxygen passing from the cathode, generating electricity and water in the process. The outlet from the anode 7 and cathode 3 are then combined in a waste anode burner 10 which generates additional heat and water. The hot gas is used to deliver heat to incoming cathode air in the heat exchanger 11, supply heat to support the steam reforming reaction in the reformer 13, generate steam in the vaporizer 9, and provide initial preheat of incoming air in the recuperator 31. Finally, liquid water is recovered from the steam in the condenser 2 and delivered to the reservoir 6. The cooled air then exits through the humidifier 1 where a portion of the water vapor present is transferred to the incoming air stream.

CLOSURE

While the invention has been illustrated and described in detail in the drawings and foregoing description, the same is to be considered as illustrative and not restrictive in character. Only certain embodiments have been shown and described, and all changes, equivalents, and modifications that come within the spirit of the invention described herein are desired to be protected. Any experiments, experimental examples, or experimental results provided herein are intended to be illustrative of the present invention and should not be considered limiting or restrictive with regard to the invention scope. Further, any theory, mechanism of operation, proof, or finding stated herein is meant to further enhance understanding of the present invention and is not intended to limit the present invention in any way to such theory, mechanism of operation, proof, or finding.

Thus, the specifics of this description and the attached drawings should not be interpreted to limit the scope of this invention to the specifics thereof. Rather, the scope of this invention should be evaluated with reference to the claims appended hereto. In reading the claims it is intended that when words such as "a", "an", "at least one", and "at least a portion" are used there is no intention to limit the claims to only one item unless specifically stated to the contrary in the claims. Further, when the language "at least a portion" and/or "a portion" is used, the claims may include a portion and/or the entire items unless specifically stated to the contrary. Likewise, where the term "input" or "output" is used in connection with an electric device or fluid processing unit, it should be understood to comprehend singular or plural and one or more signal channels or fluid lines as appropriate in the context. Finally, all publications, patents, and patent applications cited in this specification are herein incorporated by reference to the extent not inconsistent with the present disclosure as if each were specifically and individually indicated to be incorporated by reference and set forth in its entirety herein.

What is claimed is:

1. A method for improving water balance in a steam reforming power unit operating in an ambient air environment, the ambient air environment having a temperature greater than 40 degrees Celsius, the method comprising:
   a. feeding an inlet air stream through a humidifier, wherein the inlet air stream is humidified by a cooled exhaust stream;
   b. feeding the humidified inlet air stream to a fuel cell cathode, wherein a portion of the oxygen in the humidified air stream is reacted with hydrogen from a fuel cell anode to form water and to produce an air stream having increased water content and decreased oxygen content;
   c. feeding the air stream with increased water content and decreased oxygen content to a combustor where oxygen within the air stream with increased water content and decreased oxygen content is reacted to produce heat and additional water, wherein the additional water produced is contained within an effluent stream of the combustor;
   d. cooling the combustor effluent stream and condensing a portion of the effluent stream to form liquid water, wherein the liquid water is collected in a water tank;
   e. feeding the cooled effluent stream to the humidifier, wherein a portion of uncondensed water in the cooled effluent stream is transferred to the inlet air stream;
   f. heating gas exiting the cathode side of the fuel cell by flowing it on a first side of a recuperative heat exchanger with the effluent gas from the combustor flowing on a second side of the recuperative heat exchanger prior to feeding the heated gas from the cathode side of the fuel cell into the combustor, wherein the effluent stream from the combustor transfers heat to a steam reformer before flowing on the second side of the recuperative heat exchanger; and
   g. providing a second combustor that produces a second effluent that transfers heat to the steam reformer, wherein the air to the second combustor is drawn from the humidified inlet air stream through a first check valve that prevents reverse flow during operation of the first combustor, and wherein the air stream with increased water content and decreased oxygen content fed to the first combustor passes through a second check valve to prevent backward flow during operation of the second combustor.

2. The method of claim 1 wherein the step of transferring uncondensed water from the cooled effluent stream to the incoming air stream is performed by a device selected from the group consisting of a desiccant wheel and a water vapor permeable membrane.

3. The method of claim 1 wherein the second effluent is directed through the first combustor, the steam reformer, and the second side of the recuperator to the condenser.

* * * * *